Patented Feb. 17, 1942

2,273,781

UNITED STATES PATENT OFFICE 2,273,781

MEANS FOR TRANSMITTING HEAT AND POWER

Carroll A. Hochwalt, Dayton, Ohio, assignor to Monsanto Chemical Company, St. Louis, Mo., a corporation of Delaware No Drawing. Application January 8, 1938, Serial No. 184,023

15 Claims. (Cl. 252—75)

This invention relates to a means for transmitting heat and power and a method for preparing the same. More specifically, the present invention deals with the transmission of heat and power by means of aqueous solutions of organic salts of phosphoric acid.

Fluid means for transmitting heat and power have long been used in the various arts, examples of these include hydraulic recoil mechanisms, hydraulic brakes, "anti-freeze" solution for automobile radiators, aqueous brine solutions of various sorts for the manufacture of ice, solutions for liquefaction and condensation systems, and other refrigeration purposes. While requirements of the fluids for some of these uses are more exacting than others, the following are representative of properties required:

The material should be inexpensive and safe to handle. It must be stable within the probable temperature range of the operation. It must be relatively non-volatile, must not induce corrosion of the various metals of construction with which it comes into contact at ordinary or moderately elevated temperatures, and it must remain fluid and of such consistency as to be pumped and circulated at low temperatures. When the material does freeze it should not become hard nor should it expand, rather, it should be capable of flowing sufficiently to avoid rupture of the retaining metal parts. Finally, the material should be non-combustible and non-inflammable.

Various materials have been proposed for these purposes, some of the more common materials include various cuts of petroleum, aqueous alcohol solutions, aqueous glycerine solutions, aqueous ethylene glycol solutions, ordinary brine (NaCl), aqueous calcium chloride solutions and many others. None of these possess all of the desirable characteristics for which they might otherwise find use.

I have now found that salts of organic acid phosphate esters, and particularly the alkali metal salts thereof when dissolved in water produce solutions which are eminently suited for many of the foregoing purposes to an extent that is not shared by present day compositions. I have also found that such compositions may be made conveniently by reacting phosphorus pentoxide or strong phosphoric acids, such as tetraphosphoric acid, with alcohol and thereafter neutralizing to the desired pH to produce the alkali salt of the organic acid ester of phosphoric acid.

Phosphorus pentoxide or strong phosphoric acids, such as meta or tetraphosphoric acids react with monohydric alcohols and phenols, especially aliphatic alcohols such as methyl, ethyl, isopropyl, butyl, and cyclohexyl alcohols to give a mixture of mono-, di- and trialkyl or aryl phosphates in proportions varying with the temperature employed and the proportionate amounts of the initial materials used. Under suitable conditions, mixtures of such phosphates can be obtained containing only small amounts, e. g., one per cent or less, of trialkyl phosphate. The following reactions, in which R denotes an alkyl group, take place:

1. $4ROH + P_2O_5 = 2(RO)_2PO.OH + H_2O$
2. $2ROH + P_2O_5 + H_2O = 2RO.PO.(OH)_2$
3. $6ROH + P_2O_5 = 2(RO)_3PO + 3H_2O$

It is desirable that anti-freeze mixtures employed in automobile radiators, hydraulic brake systems, ice-machines, and the like, have certain special characteristics. Such mixtures should freeze at temperatures substantially below the freezing point of water. They should be relatively non-volatile, non-foaming, non-corrosive, and possess a low viscosity even at low temperatures. Solutions of alkyl phosphoric acid esters, or mixtures of these esters, do not have all of these desirable characteristics; for example, the low pH of solutions mono- or dialkyl phosphoric acid esters causes them to be corrosive, and solutions of trialkyl phosphoric acid esters do not freeze at temperatures which are substantially below that of water, a fifty per cent solution of triethyl phosphate freezing at only $-3°$ C.

It has been found, however, that by neutralizing the alkyl phosphoric acid esters with a basically reacting metal compound, mono- or dialkyl metal phosphates are obtained which have all of the desirable characteristics just above enumerated, the following reactions occurring:

4. $2(RO)_2PO.OH + K_2CO_3 =$
$2(RO)_2PO.OK + H_2O + CO_2$
5. $RO.PO.(OH)_2 + K_2CO_3 =$
$RO.PO.(OK)_2 + H_2O + CO_2$
6. $(RO)_3PO + KOH = (RO)_2PO.OK + ROH$

The neutralization shown above can be effected with substances other than potassium carbonate or potassium hydroxide. Part of the potassium carbonate can be substituted by a salt like potassium chloride, only enough potassium carbonate or potassium hydroxide being used to secure the desired alkalinity. Sodium or ammonium compounds can be used in the same manner for the production of mono- or dialkyl sodium or ammonium phosphates. For most purposes a final pH of from 7 or 7.5 to 8.5 will be found satisfactory. While for some purposes I prefer the potassium salts, the sodium and ammonium salts are satisfactory for many purposes and I refer to all three herein as "alkali metal salts."

For the purpose of this invention it is not necessary to separately recover the mixture of alkyl phosphates produced by the action of phosphorus pentoxide or strong phosphoric acid like tetraphosphoric acid with anhydrous aliphatic alcohols. The process of neutralization, however, is made more simple if the trialkyl phosphate content of such mixtures be kept at a minimum. According to the process of this invention the formation of trialkyl phosphates can be limited to less than one per cent. When the mixture of varying proportions of mono- and dialkyl phosphates and less than one per cent of trialkyl phosphate is neutralized with a basically reacting metal compound, a mixture of water-soluble, substantially neutral mono- and dialkyl metal phosphates is obtained. It has been found that aqueous solutions of varying concentrations of this mixture have freezing points substantially below those of water, and that they have the other desirable characteristics enumerated above.

Although the use of the mixture comprises a distinct advantage in eliminating the necessity of separating the salts from the reaction mixture, this invention is not limited to its use. The alkyl metal salts can be separately recovered from the reaction mixture, and the aqueous solutions of either the monoalkyl metal salts, or of the dialkyl metal salts can be used as anti-freeze mixture.

According to the process of this invention this separation can easily be effected by the step in which the mixture of alkyl phosphates resulting from the reaction of phosphorus pentoxide with anhydrous aliphatic alcohols is neutralized with calcium hydroxide, the following reactions taking place:

7.  $2(RO)_2PO.OH + Ca(OH)_2 =$
     $((RO)_2PO.O)_2Ca + 2H_2O$

8.  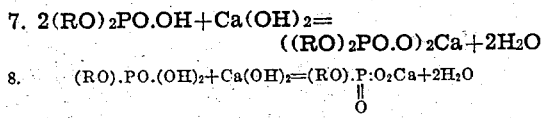

The product of Reaction 8 is insoluble monoalkyl calcium phosphate. By filtration it is separated from the water-soluble dialkyl calcium phosphate which is the product of Reaction 7. In the filtrate is also any trialkyl phosphate which may have been present in the mixture before treatment with calcium hydroxide. This can be separated from the dialkyl salt by a benzol extraction, but for the purpose of this invention no attempt is made to remove it, since the presence of this small amount of the trialkyl phosphate does not materially affect the freezing points of aqueous solutions of the final product, or since the trialkyl phosphate may be changed by hydrolysis to the dialkyl metal salt.

It has been found that the insoluble alkyl calcium phosphates are not suitable for the preparation of anti-freeze mixtures. The acid ester of the insoluble salt can be regenerated by treatment with sulfuric acid:

9. 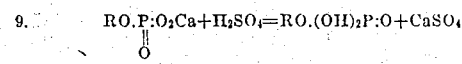

Upon neutralization with a suitable sodium, ammonium, or potassium compound the monoalkyl phosphate thus produced is changed into water-soluble, substantially neutral monoalkyl metal phosphate:

10. 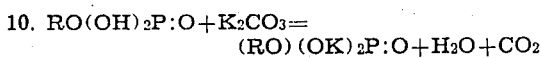

In the same manner the soluble dialkyl calcium phosphate can be treated to produce a dialkyl metal phosphate whose aqueous solution is suitable for use as anti-freeze mixture:

11. 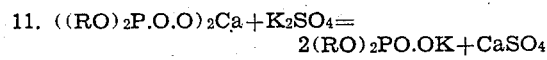

If in the preparation of the mixture of mono-, di-, and trialkyl phosphates, temperatures of about 30° C. are used there is produced a mixture consisting of approximately 59 per cent diethyl phosphate, 40 per cent of monoethyl phosphate, and about 1 per cent of trialkyl phosphate. Temperatures of over 30° C. favor the production of greater amounts of the mono-ester; temperatures below 30° C. tend toward the production of greater amounts of the di-ester. Temperatures of over 30° C. are not favorable to the formation of the trialkyl phosphates. The proportion of the mono- and diphosphates formed is also effected by varying the amount of phosphorus pentoxide employed. The use of more than 1 mol of phosphorus pentoxide for each 4 mols of alcohol tends toward the production of more monophosphate. It has been found that strong phosphoric acids such as tetraphosphoric acid can be substituted for the phosphorus pentoxide in the reactions herein described.

Instead of potassium carbonate, other basically reacting compounds or mixtures of compounds, such as potassium chloride with potassium carbonate, potassium or sodium sulfate, sodium carbonate, and sodium or potassium hydroxide, can be used for the production of mono or dialkyl metal phosphates from alkyl phosphates.

According to the process herein described I have produced such alkyl metal phosphates as mono- and dimethyl sodium phosphate, mono- and di-isopropyl phosphates, and the like. Aqueous solutions of varying proportions of these phosphates or mixtures of these phosphates have been found to freeze at temperatures substantially below the freezing point of water. They are non-volatile, non-foaming, non-corrosive, do not attack rubber even at high temperatures and retain their low viscosity at low temperature.

The following examples illustrate the process which I have used for the preparation of alkyl metal phosphates, or mixtures of these phosphates, and the properties which make them desirable for use in anti-freeze mixtures:

*Example I.*—One mol of phosphorus pentoxide is added to four mols of anhydrous ethyl alcohol. For the production of a mixture consisting of approximately 59 per cent of diethyl phosphate and 40 per cent of monoethyl phosphate, and a small amount of triethyl phosphate, the temperature is maintained at about 30° C. A theoretical yield of phosphates is obtained, based on the amount of phosphorus pentoxide.

The mixture is neutralized with potassium carbonate for the production of a mixture of water-soluble, substantially neutral mono- and diethyl potassium phosphates. Freezing points of various concentrations of aqueous solutions of this mixture of salts were determined by cooling the solutions until ice formed, then warming them, and taking the temperature at which all the ice had melted as the freezing point. A 40% aqueous solution of this mixture freezes at —23° C. The freezing point is lowered as the concentration of the mixture increases. The solutions are non-volatile, non-foaming, non-corrosive, and retain their low viscosity at low temperature.

*Example II.*—One mol of phosphorus pentoxide is added to four mols of anhydrous ethyl alcohol. The resulting mixture of phosphates described in Example I is neutralized with calcium hydroxide for the preparation of a water-insoluble monoethyl calcium phosphate and water-soluble diethyl calcium phosphate. The monosalt is separated from the reaction mixture by filtration and treated with sulfuric acid. Subsequent neutralization with potassium carbonate results in the formation of water-soluble, substantially neutral monoethyl-dipotassium phosphate. A 40 per cent solution of this salt freezes at −30° C.

*Example III.*—One mol of phosphorus pentoxide is added to four mols of anhydrous ethyl alcohol. The resulting mixture of phosphates described in Example I is neutralized with calcium hydroxide, and the insoluble monoethyl calcium phosphate thus formed is removed from the reaction mixture by filtration.

The filtrate consists of diethyl calcium phosphate and a small percentage of triethyl phosphate which had been present in the mixture before treatment with calcium hydroxide. Since the presence of this small amount of the triester does not materially affect the freezing points of aqueous solutions of the final product, no attempt is made to remove it. The entire filtrate is treated with potassium carbonate for the production of water-soluble diethyl potassium phosphate.

Freezing points of various concentrations of solutions of this salt were determined:

| Concentration of diethyl potassium phosphate | Freezing point of solution |
|---|---|
| | °C. |
| 10% | −1 |
| 20% | −4 |
| 29% | −11 |
| 40% | −19 |
| 49% | −33 |
| 60% | −40 |

The following data shows the resistance to corrosion of a 50 per cent solution of diethyl potassium phosphate. At temperatures of 89 to 91° C. metal strips of aluminum, brass, copper, and mild steel were kept in this solution for three periods of two days, four days, and six days, respectively.

*Corrosion rate cm. per day*

| | 1st period | 2nd period | 3rd period |
|---|---|---|---|
| Aluminum | +0.00000075 | +0.00000015 | +0.00000019 |
| Brass | +0.00000023 | +0.00000011 | +0.00000022 |
| Copper | −0.00000031 | −0.00000069 | −0.00000346 |
| Mild steel | −0.000012 | −0.000014 | +0.000011 |

That solutions of the salt do not hydrolyze readily is shown by the following data on hydrolysis tests in which a 50 per cent and a 1 per cent solution of diethyl potassium phosphate were kept at 89 to 91° C. for three periods.

*pH of solution*

| At start | After 2 days | After 6 days | After 12 days | |
|---|---|---|---|---|
| 7.6 | 7.6 | 7.5 | 7.7 | 50% solution |
| 7.1 | 7.1 | 7.0 | 7.1 | 1% solution |

*Example IV.*—One mol of potassium hydroxide is caused to react with one mol of triethyl phosphate. The resulting diethyl potassium phosphate is a water-soluble, substantially neutral salt whose aqueous solution is suitable as anti-freeze mixtures.

*Example V.*—One mol of phosphorus pentoxide is caused to react with 2 mols of ethyl alcohol at temperatures of over 50° C. Monoethyl phosphate is produced according to the following reactions:

$$2C_2H_5OH + P_2O_5 = C_2H_5PO_3 + C_2H_5OPO.(OH)_2$$
$$C_2H_5PO_3 + H_2O = C_2H_5OPO.(OH)_2$$

The monoethyl phosphate thus formed is treated with one mol of potassium chloride:

$$(C_2H_5O).PO.(OH)_2 + KCl = (C_2H_5O).PO.(OH).(OK) + HCl$$

Since the resulting salt is not sufficiently neutral for anti-freeze purposes, it is treated with a half mol of potassium carbonate for the production of substantially neutral monoethyldipotassium phosphate:

$$2(C_2H_5O).PO.OH.OK + K_2CO_3 = 2(C_2H_5O)PO.(OK)_2 + H_2O + CO_2$$

To illustrate the potency of my compositions as anti-freeze solutions with present day anti-freeze materials, the following results of tests are set forth:

The temperature given in each case is the temperature at which all of the ice crystals have melted. It is to be noted that concentrations above 40 per cent do not give sharp freezing points.

| Water solutions of products tested | Freezing points in degrees centigrade Aqueous concentration in percent by weight | | | | |
|---|---|---|---|---|---|
| | 20 | 30 | 40 | 45 | 50 |
| Glycerol | −5 | −9 | −15 | | −22 |
| Ethylene glycol (Prestone) | −8 | −14 | −22.5 | | −34 |
| Ethyl alcohol | −11 | −19 | −30 | | −37 |
| Triethyl phosphate | | −1 | −2 | | −3 |
| Mixed ethyl and diethyl potassium phosphate | −5.5 | −13 | −25 | −36 | −36.5 |
| Mixed isopropyl and diisopropyl potassium phosphate | −4 | −9 | −19 | | −33 |
| Mixed isopropyl and diisopropyl ammonium phosphate | −4 | −7 | −13 | | −22 |
| Diethyl potassium phosphate | −4 | −11 | −19 | | −33 |
| Mixed ethyl and diethyl ammonium phosphate | −5 | −11 | −20 | | −20 |
| Mixed ethyl and diethyl sodium phosphate | −6 | −12 | −22 | | −15 |
| Mixed methyl and dimethyl sodium phosphate | −6 | −12 | −23 | −20 | |
| Mixed methyl and dimethyl potassium phosphate | −6 | −14.5 | −27 | −42 | −39 |
| Mixed methyl and dimethyl ammonium phosphate | −8 | −16 | −28 | | −28 |
| Monoethyl potassium phosphate | −6 | −14 | −30 | −34 | −27 |

Potassium compounds are in general considered preferable to the sodium compound. Thus, for example, the 50 per cent solution of mixed ethyl and diethyl potassium phosphate was cooled to −70° C. at which temperature the solution became very stiff and gel-like. However, a glass rod could still be pushed through the mass without difficulty, thus indicating that the material would flow under pressure.

The degree of alkalinity of the mixtures may be varied. In general, materials exposed to aluminum should be of restricted alkalinity, a pH range of 7.0 or 7.5 to 8.0 or 8.5 is satisfactory. On the other hand, materials which are known to be more resistant to alkali, such as copper, brass, iron and the like, are not affected even at a pH of 9 or even higher.

It is to be understood that the product used according to the present invention need not be made by the methods described herein, but on the contrary may be made by any known method. While I prefer to use the method of reacting the anhydrous alcohol with $P_2O_5$ or concentrated phosphoric acids, it is within the contemplation of the invention that materials can be made by reacting the trialkyl phosphate with $P_2O_5$ or phosphoric acid which subsequently is neutralized by any suitable method. While I prefer from the point of view of cost to use the monohydric alkyl alcohol, such as methyl, ethyl and the like, the higher members of this group may be used, such as butyl alcohol. Similarly, one may use other monohydric alkyl alcohols, such as the monoalkyl ethers of ethylene glycol.

If desired, one may add to the aqueous composition of the present invention, ingredients such as are commonly used today in anti-freeze solution, including dyes, water soluble alcohols, rust inhibitors, soaps, amines, hydroxyl-amines, etc., as is well understood by those skilled in this art. Mixtures of the alkali salts containing the soluble alkaline earth metal salts, also the organic amine salts, may be used; however, I prefer to use ammonium, sodium or potassium compounds either alone or mixtures thereof.

What I claim is:

1. A fluid medium for transmitting energy comprising water and from 20 to 50% by weight of a water-soluble phosphate mixture comprising potassium monoethyl phosphate and potassium diethyl phosphate, said mixture being dissolved in said water in sufficient amounts to depress substantially the freezing point of water and said medium having a pH between about 7 and 8.5.

2. A fluid medium for transmitting energy comprising an aqueous solution containing from about 50 to 60% of water and from about 40 to 50% of a phosphate mixture, said phosphate mixture containing about 59% of alkali metal dialkyl phosphate, about 40% of alkali metal monoalkyl phosphate and about 1% of alkali metal trialkyl phosphate.

3. A fluid medium for transmitting energy comprising an aqueous solution containing from about 50 to 60% of water and from about 40 to 50% of a phosphate mixture, said phosphate mixture containing about 59% of potassium diethyl phosphate, about 40% of potassium monoethyl phosphate, and about 1% of potassium triethyl phosphate.

4. The method of transferring energy which comprises using as the transfer medium an aqueous solution containing a water-soluble alkali metal salt of a monohydric alcohol acid ester of a phosphoric acid in amounts sufficient to depress substantially the freezing point of said solution.

5. The method of transferring energy which comprises using as the transfer medium an aqueous solution containing a water-soluble alkali metal salt of a monohydric alkyl alcohol acid ester of phosphoric acid in amounts sufficient to depress substantially the freezing point of said solution.

6. The method of transferring energy which comprises using as the transfer medium an aqueous solution containing a mixture of the water-soluble alkali metal salts of the mono- and di-alkyl esters of phosphoric acid in amounts sufficient to depress substantially the freezing point of said solution.

7. The method of transferring energy which comprises using as the transfer medium an aqueous solution containing a water-soluble phosphate mixture comprising potassium monoethyl phosphate and potassium diethyl phosphate, said mixture being present in said solution in sufficient amounts to depress substantially the freezing point of water, and said solution having a pH between about 7 and 8.5.

8. A fluid medium for transmitting energy comprising water and from 20 to 50% by weight of a water-soluble phosphate mixture comprising an alkali metal salt of a monoalkyl acid ester of a phosphoric acid and an alkali metal salt of a dialkyl acid ester of a phosphoric acid.

9. The fluid medium as defined in claim 8 and further characterized in that it has a pH of from 7 to 8.5.

10. The fluid medium as defined in claim 8 and further characterized in that the cations of the alkali metal salts are selected from the group consisting of sodium, potassium and ammonium.

11. The fluid medium as defined in claim 8 and further characterized in that the amount of phosphate mixture present is sufficient to depress the freezing point of the water to $-20°$ C.

12. The fluid medium as defined in claim 8 and further characterized in that it contains a water-soluble alcohol dissolved therein.

13. The method of transferring energy which comprises using as the transfer medium an aqueous solution containing a water-soluble alkali metal salt of a monoalkyl ester of phosphoric acid in amounts sufficient to depress substantially the freezing point of said solution.

14. The method of transferring energy which comprises using as the transfer medium an aqueous solution containing a water-soluble alkali metal salt of a dialkyl ester of phosphoric acid in amounts sufficient to depress substantially the freezing point of said solution.

15. The method of transferring energy which comprises using as the transfer medium an aqueous solution containing from about 50 to 80% of water and from about 20 to 50% of a phosphate mixture, said phosphate mixture containing about 59% of potassium diethyl phosphate, about 40% of potassium monoethyl phosphate, and about 1% of potassium triethyl phosphate.

CARROLL A. HOCHWALT.